DeW. C. PRESCOTT.
Direct Acting Steam Feed Works for Circular Saw Mills.
No. 8,160. Reissued April 9, 1878.
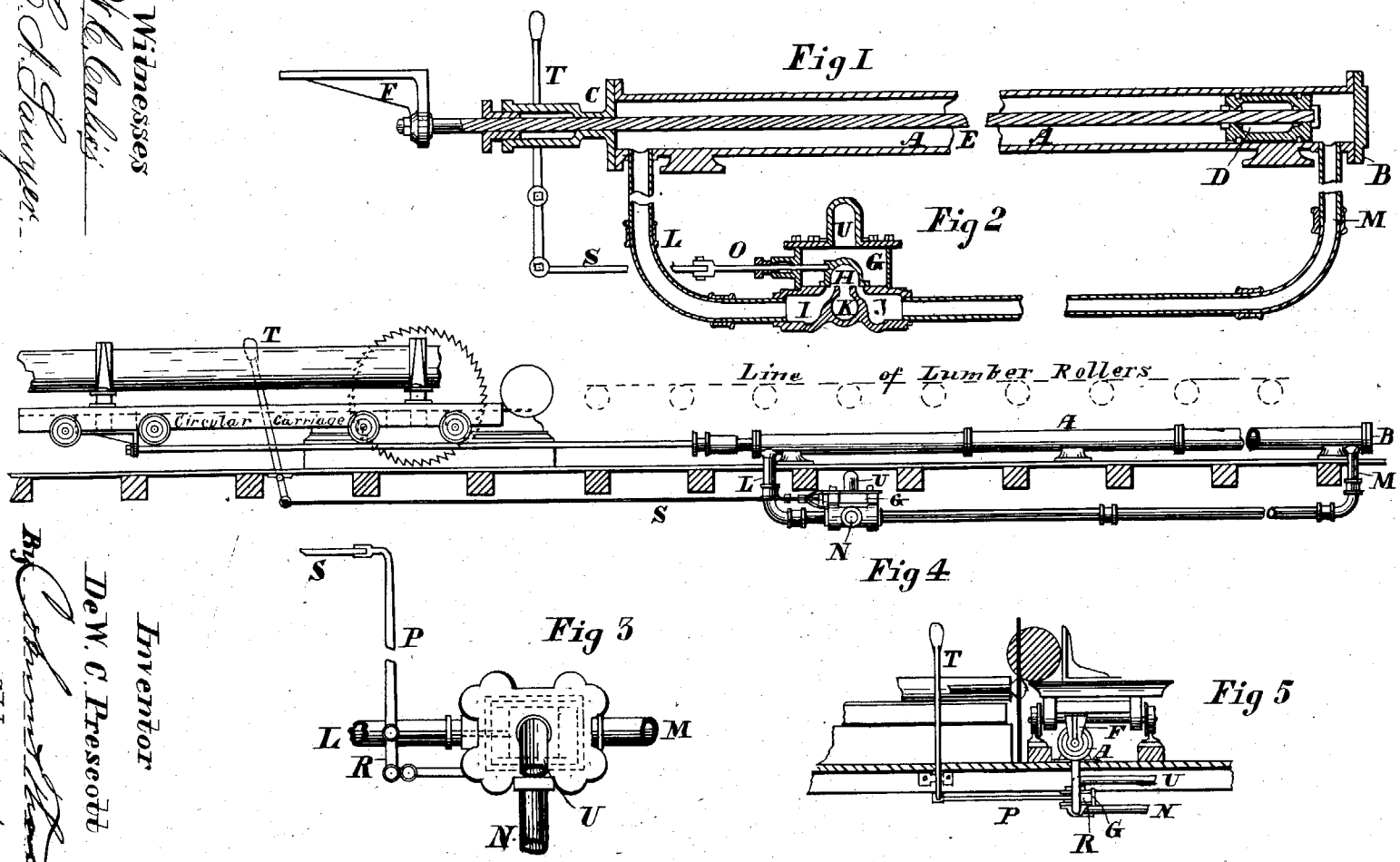
Witnesses
W. C. Carlis
C. A. Sawyer
Inventor
DeW. C. Prescott
By Cobourn & Thacher
Attorneys

UNITED STATES PATENT OFFICE.

DE WITT CLINTON PRESCOTT, OF MARINETTE, WISCONSIN.

IMPROVEMENT IN DIRECT-ACTING STEAM-FEED WORKS FOR CIRCULAR-SAW MILLS.

Specification forming part of Letters Patent No. 174,004, dated February 22, 1876; Reissue No. 8,160, dated April 9, 1878; application filed March 25, 1878.

*To all whom it may concern:*

Be it known that I, DE WITT CLINTON PRESCOTT, of Marinette, county of Oconto, and State of Wisconsin, have invented certain new and useful Improvements in Direct-Acting Steam-Feed Works for Circular-Saw Mills, which are fully set forth in the following specification, reference being had to the accompanying drawings.

My invention relates to that particular part of circular or rotary saw mills termed the "feed-works," by means of which the log (being supported upon its carriage) is propelled or fed against the saw, and also is returned or gigged back to its original position after a portion has been sawed from it, thus accomplishing, in conjunction with other mechanisms, the manufacture of lumber; and my object is to dispense with the combination of belts, pulleys, shafts, frictions, and gearing which is now in general use for that purpose, and also to obtain a more prompt and efficient action of the log-carriage when in operation.

The principle of my invention consists in applying the power of steam directly to the log-carriage, and by this power, which I cause to act instantly and in a direct manner upon it, to impart the reciprocating motion which it requires; and the apparatus or mechanism I use for this purpose is hereinafter described and shown.

In the accompanying plate of drawings, Figures 1, 2, and 3 show detail views of the mechanism; Figs. 4 and 5, its application in connection with the other parts of a circular or rotary saw mill of otherwise ordinary construction.

The construction of my apparatus is as follows:

In the drawing, Fig. 1, in section, A designates a steam-cylinder, of the same length as the greatest run or travel of the log-carriage, proper allowance also being made for clearance at each end, to prevent the piston from striking the cylinder-heads B and C, which are fitted to it.

D is a piston-head, constructed in a manner steam-tight, and of suitable form. To this is attached one end of piston-rod E, which passes out of cylinder A through the stuffing-box in cylinder-head C, the other end thereof being attached securely to the log-carriage by means of the bracket F, which is bolted to it at a suitable point to obtain a proper travel of the carriage, and at the same time to secure a corresponding regular travel of the piston-head D in cylinder A. The said piston-rod E is composed of iron pipe, though steel pipe or solid rods may be used.

Fig. 2 shows a sectional view of the steam-chest G, containing the slide-valve H, which operates upon a valve-seat in lower part of steam-chest G, in which are steam-ports I and J and exhaust-port K.

The slide-valve H is so constructed that, when placed upon the center of its stroke, it will present exhaust-openings to both of ports I and J. L and M are steam-pipes leading from the openings of steam-ports I and J to each corresponding end of cylinder A. N is a pipe connected at opening of exhaust-port K to convey away exhausted steam. O is a valve stem or rod attached to slide-valve H, and also to lever P, with its fulcrum R, which, with connecting-rod S and hand-lever T, enables the sawyer to operate with the slide-valve H. (See plan of steam-chest, Fig. 3.) U is a steam-pipe leading from steam-chest G to a boiler from which power is supplied, which it has not been deemed necessary to show. Portions of steam-cylinder A, piston-rod E, and steam-pipes L and M are removed; but they are supposed to be of proper length.

The operation of the machine is as follows: The cylinder A being securely fastened to the mill-floor or overlay-timbers, and the piston-rod E attached to the log-carriage, the valve levers and rod P, T, and S are placed in position, as shown, and steam admitted through steam-pipe U into steam-chest G. A log is placed upon the carriage when in position in front of the saw and somewhat to the left of the position shown in Fig. 4. Then, by means of the hand-lever T, the slide-valve H is moved in the right direction to admit sufficient steam through steam-pipe L into the cylinder A to impart motion to the log-carriage by means of the piston-head D, piston-rod E, and bracket F. In this manner the log (being upon the carriage in proper position) is propelled or fed against the saw, which cuts off a slab, board, or plank, as the case may be, as the log passes.

This being accomplished, the position of the hand-lever T is reversed, and with it the slide-valve H, which exhausts the steam just employed, and admits live steam into the cylinder A through steam-pipe M, by which the log-carriage is forced or gigged back to its original position before the saw, ready for the next cut, the sawyer maintaining complete control of the carriage at all times by means of the hand-lever T, as before stated.

In the construction of my apparatus I have adopted and shown what I have deemed the best mode of applying the principle of my invention; but it can be successfully applied in other ways—for instance, the steam-cylinder can be attached to and travel with the log-carriage. Again, two cylinders can be employed, with one of which to operate the log-carriage in feeding—the other to run or gig it back to its original position.

Having thus described the principle and construction, as well as the operation, of my invention, I will state what I claim and desire to secure by Letters Patent:

1. The method of applying steam-power in a direct manner to operate log-carriages of circular or rotary saw mills in the process of sawing or manufacturing lumber, as specified.

2. In a circular-saw mill, the log-carriage, in combination with a steam-cylinder of about the same length as the greatest run or travel of the carriage, and provided with a piston, either the cylinder or piston being connected directly to the carriage, substantially as and for the purpose set forth.

3. The log-carrier, in combination with a steam-cylinder of about the same length as the greatest run of the carriage, a piston fitted within the cylinder and connected directly to the carriage, and mechanism whereby the travel of the carriage and operation of the steam-feeding device may be regulated, substantially as described.

4. The steam-cylinder A, in combination with the piston-head D, piston-rod E, bracket F, attached to the log-carriage, and steam-chest G, provided with valve H and supply and exhaust ports, lever P, connected to the valve-stem, and hand-lever T, connected to the lever P, substantially as and for the purpose set forth.

DE WITT CLINTON PRESCOTT.

Witnesses:
GEO. H. CANNON,
W. J. TAYLOR.